Figure 1:
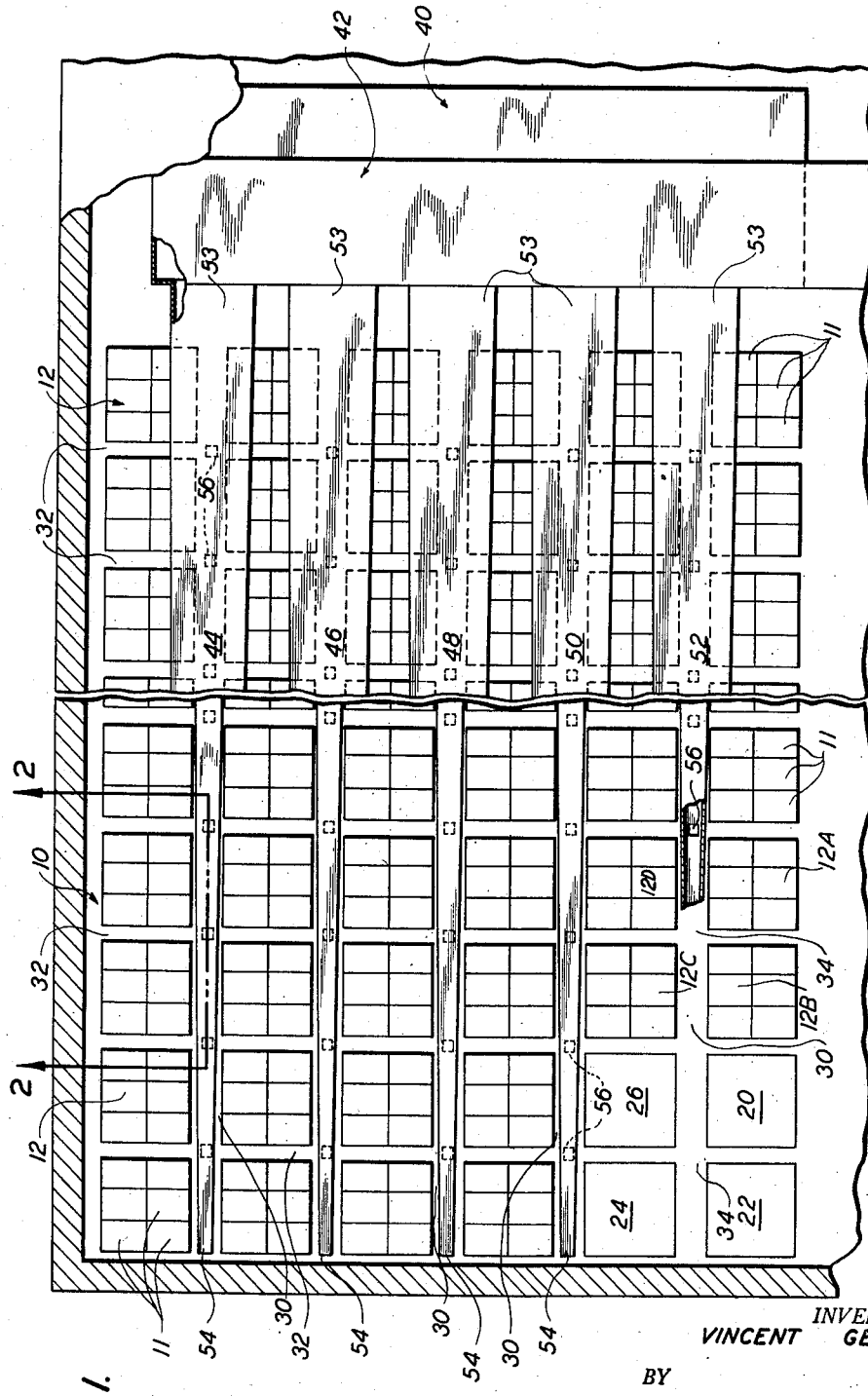

March 4, 1958 V. GESSEL 2,825,211
PRECOOLING OF PACKAGED PRODUCE
Filed July 1, 1955 2 Sheets-Sheet 2

INVENTOR.
VINCENT GESSEL
BY
Christie, Parker & Hale
ATTORNEYS

United States Patent Office 2,825,211
Patented Mar. 4, 1958

2,825,211

PRECOOLING OF PACKAGED PRODUCE

Vincent Gessel, Pasadena, Calif.

Application July 1, 1955, Serial No. 519,533

2 Claims. (Cl. 62—171)

This invention relates to an improved method and apparatus for cooling packaged produce.

Most food produce begins to deteriorate soon after it is harvested due to the growth of decay organisms. The early start of deterioration is a problem when shipment of the produce entails travel time up to eight days. Early efforts to halt or diminish deterioration of the produce resulted in the development of the iced freight car or refrigerator car. The use of refrigerator cars arrested deterioration during the period of shipment but did not correct the basic problem. Growth of the organisms that cause deterioration of the produce was uninhibited from the moment of harvesting until the moment during shipment when the temperature of the produce was lowered enough by the dwell time in the refrigerator car to accomplish the desired objective.

Dissatisfaction with mere iced shipment of the produce resulted in the development of the technique known as precooling, in which the packaged produce is stored prior to shipment in rooms suitable for refrigerating the packaged produce by any one of several conventional cooling processes.

Usually the produce is packaged in cartons quickly after harvest and stacked in the refrigerating rooms and relatively cool air is circulated in the room to lower the temperature of the produce within the cartons so that deterioration is arrested at the earliest possible moment. The conventional precooling as described above results in a marked improvement in the marketability of the produce when it reaches the final destination. However, because of the inefficient distribution of the cooled primary air in the refrigerating room, conventional precooling of cartons of produce such as oranges requires a minimum of 48 hours to lower the temperature of the produce to 60° (the highest acceptable temperature for the storage and shipment of oranges). Substantially complete arrest of deterioration requires a lowering of the produce temperature to about 38° but with conventional precooling techniques this temperature is seldom attained in a short enough interval after harvest to preclude the start of deterioration.

Use of the method and apparatus of the invention permits the cooling of packaged produce such as oranges to a temperature of 60° within 24 hours (half the conventional time) and accomplishes the lowering of the produce temperature to 38° in the same time conventionally required to cool the produce to 60°.

This not only results in a product of greater marketability but permits storage prior to shipment for a much greater length of time. The economically feasible lower temperature of the produce saves as much as $40 per car in icing costs during a typical refrigerator car shipment of the produce from California to the east coast.

Further details of the advantages of rapid precooling by the process of the invention are outlined in an article entitled "Rapid precooling halts citrus decay" by B. E. Lovel, published in the March, 1955 issue of the trade magazine "Western Fruit Growers Combined With Fruit and Produce Packer."

The advantages of the method of the invention stem from the efficient use of the primary or cooling air, and from the method of distributing this air which involves relying on the packaged produce itself as an integral part of the cooling system. The primary air preferably is both humid and cool, so that the moisture content of the humid primary air enables cooling of the produce without loss of moisture by the produce. Rapid cooling is also aided by the fact that the invention assures that each carton of produce is contacted by a stream of primary air. The invention is an improvement in the refrigerating of packaged produce and involves stacking the produce packages one upon the other in a room to form a plurality of stacks that are spaced from each other and directing jets of relatively cold primary air downwardly into the space between the stacks.

The stacks of packaged produce are arranged on the floor of the refrigerating room in a substantially uniform pattern so that the stacks are spaced from each other in a manner to form longitudinal and transverse channels. In this fashion the packaged produce itself froms distribution ducts or channels which distribute the cold and humid primary air directly to the cartons.

Conventionally, precooling is accomplished by directing primary air into the refrigerating room in a path along the run of the stacks. By the time the primary air reaches the produce at the end of the stacks remote from the discharge of the primary air, the temperature of the air has been raised by contact with the intervening packages of produce. Therefore, uniform cooling of the produce is almost impossible and the warmer secondary or return air usually follows a path which interferes with the flow of the primary air.

In contrast and as practiced in the preferred process of the invention the cartons of packaged produce are stacked one on top of each other in the refrigerated room to a height that is less than ceiling height to from a plurality of stacks that are spaced from each other so that they form intersecting spaces or channels. Jets of relatively cool and humid primary air are directed downwardly into the spaces between the stacks at the intersections of the spaces. The warm secondary air circulates out of the spaces between the stacks to the space above the rows of stacks and outwardly to the space beyond the confines of the rows of stacks where the resistance to air flow is lowest and is withdrawn at low velocity from the space above the stacks and the spaces beyond the confines of the rows of stacks.

Distribution of the primary air, which is preferably relatively cool and humid air, is accomplished by means of overhead distributing ducts which have openings through which the primary air is directed downwardly between the stacks, reaching all of the produce at approximately the same time.

Figure 2:
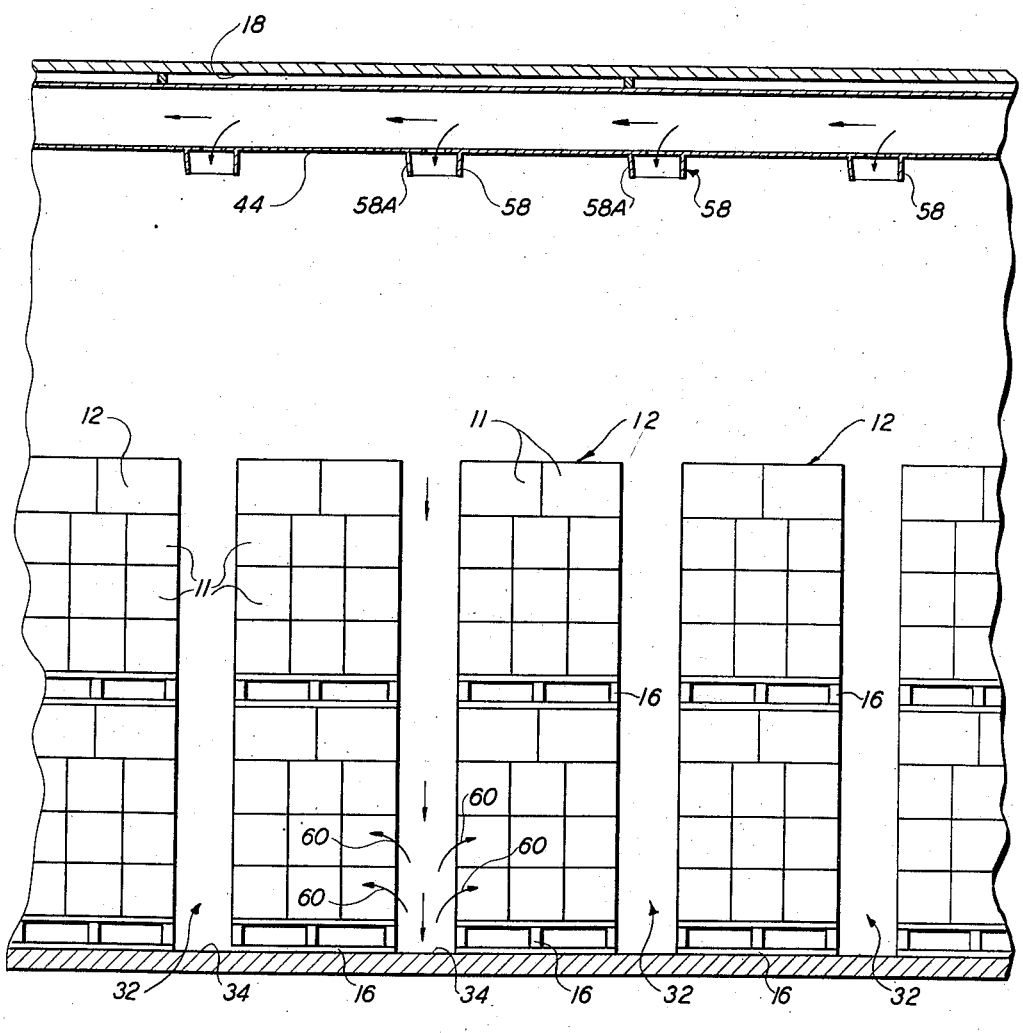

The preferred method and apparatus of the invention is illustrated and described in more retail in the following detailed specification and drawing, in which:

Fig. 1 is a fragmentary plan view of a room containing packaged produce stacked in accordance with the invention, and Fig. 2 is a sectional elevation taken along line 2—2 of Fig. 1.

Fig. 1 illustrates a portion of a cooling shed 10 in which a number of cartons 11 of produce such as half boxes of oranges are arranged in longitudinal and transverse rows of stacks 12. Each of the stacks (see Fig. 2) is made up of 48 half boxes. A pallet 16 supports a group of 24 half boxes. The boxes are stacked two pallet loads high to form a stack approximately eight feet high having a base area three feet square. The shed has a ceiling 18 which is high enough to leave the substantial space between the ceiling and the top cartons of packaged produce. As can be noted from the figures, the half boxes or cartons are arranged on each pallet so that at least one surface of each carton is exposed.

It has been found expedient to paint a pattern on the floor of the shed, leaving unpainted a square such as squares 20, 22, 24, 26 in Fig. 1, to define the exact location of the base of each stack. When the packaged produce is positioned according to the painted floor pattern the intervals between stacks form a plurality of longitudinal channels 30 and a plurality of transverse channels 32. The longitudinal and transverse channels cross each other at a number of intersection points 34.

An air-conditioning unit 40 supplies cool and humid primary air to a distributing manifold 42 which supplies the primary air to a plurality of distributing ducts 44, 46, 48, 50, 52. The distributing ducts are mounted adjacent the ceiling of the shed (see Fig. 2) and extend the length of the longitudinal channels between the stacks and are directly centered above the channels. There is a duct above each longitudinal channel.

The ducts are designed on an equal friction basis and each tapers from a large end 53 adjoining the manifold to a small end 54 remote from the manifold. The depth of each duct is uniform throughout its length. The construction insures uniform distribution of the primary air throughout the shed.

Downwardly opening orifices 56 are located in each duct directly above each point of intersection of the longitudinal and transverse channels formed by the stacks. A hood 58 surrounds each orifice. The hood is a shallow rectangular box having three perpendicular sides and a forward side 58A on the downstream side of the orifice which slopes downwardly and inwardly toward the center of the box at an angle of about 85° to the bottom of the distributing duct. The inward deflection of the forward side of the box compensates for the forward flow of the primary air supplied to the ducts, thereby causing the jet of primary air discharged through the orifice to strike the floor of the shed at substantially the center of the intersection points of the channels.

A number of arows 60 in Fig. 2 illustrate the dispersal pattern of the primary air as it is deflected from the floor at the intersection point. The primary air is jetted donwardly from the orifice in the overhead distributing duct on a substantially vertical path into the intersecting space formed by four adjoining stacks such as the stacks 12A, 12B, 12C, 12D in Fig. 1. After striking the floor the jet of air is dispersed and flows longitudinally and transversely between the stacks in the channels formed by the stacked produce. It is preferable that the jet be of such velocity that its strikes the floor before dispersing to contact the cartons. In effect the floor is used as a dispersing baffle.

Since a jet of primary air flows directly into each intersection of the longitudinal and transverse channels formed by the stacks of packaged produce, each stack and its component cartons of produce are cooled by a direct blast of primary air. The continuity of the channels enables the diffused or deflected air to blow between the stacks upwardly into the space between the top of the stacks and the ceiling of the cooling shed, and outwardly into the space beyond the confines of the rows of stacks to be returned at relatively low velocity as secondary air to the air-conditioning unit.

The method of the inventoin insures distribution of primary air directly to each of the cartons of produce and avoids the interference conventionally present in the flow of the secondary air with respect to the primary air. Best results are obtained when the channels formed by the packaged produce are no more than twelve inches wide and no narower than four inches when stacked in a packing shed. The optimum channel dimension has been found to be eleven inches for the longitudinal channels and five and one-quarter inches for the transverse or short channels.

Primary air discharged at a temperature of approximately 27° will cool produce stacked as outlined above to below 40° in 48 hours. This is the time increment conventionally required to lower the temperature of the produce to 60°. Thus produce cooled in accordance with the method of the invention is cooled rapidly enough to preclude substantially all deterioration of the produce during the conventional period of handling and shipping.

Another advantage from the method is that the cooling shed need not be fully loaded to cool efficiently the packaged produce, since the flow of primary air is directed to each individual stack of produce. Partial shipments of less than shed capacity may be withdrawn from the shed without affecting the remaining stacks, and field temperature produce brought in to replace the shipped cartons will not affect the cooling time of the remaining stacked produce. There is no effect on the remaining stacks because there is no flow of warm secondary air from one section of the stacked produce to another section. Each stack is cooled at the same rate regardless of the phase of the cooling cycle of adjacent stacks. The stacking pattern also enables a given quantity of produce to be cooled quickly in much less floor space than needed for conventional methods of pre-cooling.

Because of the practically simultaneous distribution of the primary air to all of the produce, large latitude is permitted in design of packing shed buildings, resulting in more economical structures than formerly.

I claim:

1. In the refrigeration of packaged produce the improvement which involves stacking the packages one upon the other in a room to a height less than the ceiling height to form a plurality of stacks spaced from each other, directing jets of cold primary air downwardly into the spaces between the stacks to cool the produce so that spent secondary air circulates out of the spaces between the stacks to the space above the rows of stacks, and withdrawing the spent secondary air from the space above the rows of stacks.

2. In the refrigeration of packaged produce the improvement which involves stacking the packages one upon the other in a room to a height less than the ceiling height to form a plurality of stacks spaced from each other to form intersecting spaces, directing jets of relatively cold and humid primary air downwardly into the spaces between the stacks at the intersections of the spaces to cool the produce so that spent secondary air circulates out of the spaces between the stacks to the space above the rows of stacks, and withdrawing the spent secondary air from the space above the rows of stacks.

References Cited in the file of this patent
UNITED STATES PATENTS

| | | |
|---|---|---|
| 2,221,927 | Reilly | Nov. 19, 1940 |
| 2,442,932 | Nalbandian | June 8, 1948 |

OTHER REFERENCES

Western Fruit Grower, March 1955, pages 53 and 54.